US007496412B2

(12) United States Patent
Banton et al.

(10) Patent No.: US 7,496,412 B2
(45) Date of Patent: Feb. 24, 2009

(54) CONTROL METHOD USING DYNAMIC LATITUDE ALLOCATION AND SETPOINT MODIFICATION, SYSTEM USING THE CONTROL METHOD, AND COMPUTER READABLE RECORDING MEDIA CONTAINING THE CONTROL METHOD

(75) Inventors: Martin E Banton, Fairport, NY (US); Nancy B Goodman, Webster, NY (US); Dale R Mashtare, Bloomfield, NY (US); Mark S Jackson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 444 days.

(21) Appl. No.: 11/191,979

(22) Filed: Jul. 29, 2005

(65) Prior Publication Data

US 2007/0027559 A1 Feb. 1, 2007

(51) Int. Cl.
*G05B 13/02* (2006.01)

(52) U.S. Cl. ........................................... 700/28; 700/34

(58) Field of Classification Search ..................... 399/9; 700/28, 34

See application file for complete search history.

(56) References Cited

U.S. PATENT DOCUMENTS

| | | | | |
|---|---|---|---|---|
| 4,579,466 | A | | 4/1986 | Sato |
| 4,587,532 | A | | 5/1986 | Asano |
| 4,836,119 | A | | 6/1989 | Siraco |
| 5,004,222 | A | | 4/1991 | Dobashi |
| 5,080,340 | A | | 1/1992 | Hacknauer |
| 5,095,342 | A | | 3/1992 | Farrell |
| 5,159,395 | A | | 10/1992 | Farrell |
| 5,208,640 | A | | 5/1993 | Horie |
| 5,272,511 | A | | 12/1993 | Conrad |
| 5,324,614 | A | * | 6/1994 | Bluett ........................ 430/54 |
| 5,326,093 | A | | 7/1994 | Sollitt |
| 5,389,969 | A | | 2/1995 | Suzuki |
| 5,435,544 | A | | 7/1995 | Mandel |
| 5,471,313 | A | * | 11/1995 | Thieret et al. ............... 358/296 |
| 5,473,419 | A | | 12/1995 | Russel |
| 5,504,568 | A | | 4/1996 | Saraswat |

(Continued)

OTHER PUBLICATIONS

U.S. Appl. No. 11/084,280, filed Mar. 18, 2005, Mizes.

(Continued)

*Primary Examiner*—Albert DeCady
*Assistant Examiner*—Darrin Dunn
(74) *Attorney, Agent, or Firm*—Oliff & Berridge, PLC

(57) ABSTRACT

In a system including a plurality of elements, or plurality of subsystems of elements, each performing a process using process control to maintain operation within a latitude of a setpoint and having an output characteristic that contributes to an overall output quality specification of the system, a control method includes setting a desired overall output quality specification, and determining optimum setpoints and latitudes of the plurality of elements, within a range of possible setpoints and latitudes for each element, to achieve the desired overall output quality specification. The control method further includes dynamically re-setting the setpoints and/or re-allocating the latitudes of at least two of the plurality of elements (or subsystems of elements) to compensate for degradation of the attribute caused by variation in the output characteristic of one element within the desired overall output quality specification. The system may be an image forming apparatus, such as a xerographic system, or a modular document processing system. The control method may be stored on a computer readable media.

20 Claims, 5 Drawing Sheets

U.S. PATENT DOCUMENTS

| | | | | |
|---|---|---|---|---|
| 5,525,031 | A | 6/1996 | Fox | |
| 5,557,367 | A | 9/1996 | Yang | |
| 5,568,246 | A | 10/1996 | Keller | |
| 5,570,172 | A | 10/1996 | Acquaviva | |
| 5,596,416 | A | 1/1997 | Barry | |
| 5,629,762 | A | 5/1997 | Mahoney | |
| 5,710,968 | A | 1/1998 | Clark | |
| 5,778,377 | A | 7/1998 | Marlin | |
| 5,884,910 | A | 3/1999 | Mandel | |
| 5,923,834 | A * | 7/1999 | Thieret et al. | 714/25 |
| 5,995,721 | A | 11/1999 | Rourke | |
| 6,059,284 | A | 5/2000 | Wolf | |
| 6,125,248 | A | 9/2000 | Moser | |
| 6,241,242 | B1 | 6/2001 | Munro | |
| 6,297,886 | B1 | 10/2001 | Cornell | |
| 6,341,773 | B1 | 1/2002 | Aprato et al. | |
| 6,384,918 | B1 | 5/2002 | Hubble, III | |
| 6,450,711 | B1 | 9/2002 | Conrow | |
| 6,476,376 | B1 | 11/2002 | Biegelsen | |
| 6,476,923 | B1 | 11/2002 | Cornell | |
| 6,493,098 | B1 | 12/2002 | Cornell | |
| 6,537,910 | B1 | 3/2003 | Burke | |
| 6,550,762 | B2 | 4/2003 | Stoll | |
| 6,554,276 | B2 | 4/2003 | Jackson | |
| 6,577,925 | B1 | 6/2003 | Fromherz | |
| 6,607,320 | B2 | 8/2003 | Bobrow | |
| 6,608,988 | B2 | 8/2003 | Conrow | |
| 6,612,566 | B2 | 9/2003 | Stoll | |
| 6,612,571 | B2 | 9/2003 | Rider | |
| 6,621,576 | B2 | 9/2003 | Tandon | |
| 6,633,382 | B2 | 10/2003 | Hubble, III | |
| 6,639,669 | B2 | 10/2003 | Hubble, III | |
| 6,735,484 | B1 * | 5/2004 | Lenz | 700/51 |
| 6,819,906 | B1 | 11/2004 | Herrmann | |
| 6,847,465 | B1 * | 1/2005 | Wetchler et al. | 358/1.13 |
| 7,099,025 | B2 * | 8/2006 | Nagashima | 358/1.15 |
| 2002/0078012 | A1 | 6/2002 | Ryan et al. | |
| 2002/0103559 | A1 | 8/2002 | Gartstein | |
| 2003/0077095 | A1 | 4/2003 | Conrow | |
| 2003/0235450 | A1 * | 12/2003 | Okamoto et al. | 399/407 |
| 2004/0085561 | A1 | 5/2004 | Fromherz | |
| 2004/0085562 | A1 | 5/2004 | Fromherz | |
| 2004/0088207 | A1 | 5/2004 | Fromherz | |
| 2004/0150156 | A1 | 8/2004 | Fromherz et al. | |
| 2004/0150158 | A1 | 8/2004 | Biegelsen et al. | |
| 2004/0153983 | A1 | 8/2004 | McMillan | |
| 2004/0216002 | A1 | 10/2004 | Fromherz et al. | |
| 2004/0225391 | A1 | 11/2004 | Fromherz et al. | |
| 2004/0225394 | A1 | 11/2004 | Fromherz et al. | |
| 2004/0247365 | A1 | 12/2004 | Lofthus et al. | |

OTHER PUBLICATIONS

Morgan, P.F., "Integration of Black Only and Color Printers", Xerox Disclosure Journal, vol. 16, No. 6, Nov./Dec. 1991, pp. 381-383.
U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 60/631,151, filed Nov. 30, 2004, Anderson et al.
U.S. Appl. No. 60/631,656, filed Nov. 30, 2004, Moore.
U.S. Appl. No. 60/631,918, filed Nov. 30, 2004, Anderson et al.
U.S. Appl. No. 60/631,921, filed Nov. 30, 2007, Anderson et al.
U.S. Appl. No. 10/860,195, filed Aug. 23, 2004, Lofthus et al.
U.S. Appl. No. 11/093,229, filed Mar. 29, 2005, Julien.
U.S. Appl. No. 11/522,171, filed Mar. 31, 2005, Julien.
U.S. Appl. No. 11/094,864, filed Mar. 31, 2005, deJong et al.
U.S. Appl. No. 11/109,996, filed Apr. 20, 2005, Mongeon.

* cited by examiner

CONTROL METHOD USING DYNAMIC LATITUDE ALLOCATION AND SETPOINT MODIFICATION, SYSTEM USING THE CONTROL METHOD, AND COMPUTER READABLE RECORDING MEDIA CONTAINING THE CONTROL METHOD

BACKGROUND

The present disclosure relates generally to a control method for a system including a plurality of elements (or plurality of subsystems of elements), each performing a process using local process control to maintain operation of the process within a latitude around a setpoint and having an output characteristic that contributes to an attribute of an overall output quality specification of the system. More particularly, the present disclosure relates to a control method that dynamically re-sets the setpoint and/or re-allocates the latitude of at least two of the plurality of elements to compensate for an element operating near or beyond its latitude edge so as to preclude degradation of an output characteristic of one of the elements and maintain the attribute within the overall output quality specification of the system during operation.

The control method may have utility in many applications. In one application, the control method may have utility in a printing system in which two or more process elements sequentially perform different image forming processes having different output characteristics that contribute to one or more attributes of an overall output image quality specification of the system. Examples of such printing systems include an electro-photographic or xerographic system, an ink jet printing system, a thermal printing system, and the like. In another application, the control method may have utility in a printing system in which two or more like or similar print engines (or marking engines), or two or more different print engines having the same or similar output attribute(s), are used in parallel to generate high page volume output, satisfying an overall output image quality specification. An example of such a printing system is a document processing system with multiple marking engines.

The present disclosure also relates to a system using the control method, and computer readable recording media containing the control method.

Systems including a plurality of elements (or plurality of subsystems of elements) each performing a process using local process control to maintain operation of the process within a latitude around a setpoint and having an output characteristic that contributes to an attribute of an overall output quality specification are known. For example, in a known xerographic or electro-photographic printing system, the plurality of process elements may include: a photoreceptor, a charging device, an exposing device, a developing device, a transfer device, a fixing device, and the like.

The process elements perform respective system processes. For example, in a known xerographic or electro-photographic printing system, the image forming processes may include: rotating/moving the photoreceptor; charging a surface of the photoreceptor; exposing the charged photoreceptor to light to form a latent image on the photoreceptor; applying toner particles to the latent image to develop the latent image on the photoreceptor; transferring the developed image from the photoreceptor onto a recording media; fixing the toner image on the recording media; and the like.

Each process element uses local process control (e.g., a simple feedback control loop) to maintain operation of each process within a latitude around a setpoint to obtain a desired output characteristic. For example, in a known xerographic or electro-photographic printing system, the control processes may include: a process of controlling rotation of a photoreceptor drum to achieve a rotation speed=$S_{rot}$+/−$\Delta S_{rot}$; a process of controlling the amount of charge applied to the surface of the photoreceptor to achieve a charge density on the photoreceptor=$V_{cd}$+/−$\Delta V_{cd}$; a process of controlling the intensity of light incident on the photoreceptor to achieve a latent image charge density on the photoreceptor=$V_{icd}$+/−$\Delta V_{icd}$; a process of controlling the toner concentration of developer applied to the latent image to achieve a toner density=$D_t$+/−$\Delta D_t$; a process of controlling the amount of transfer charge applied at a transfer region=$V_{tc}$+/−$\Delta V_{tc}$; a process of fixing the toner image on the recording media by applying a fixing pressure=$P_f$+/−$\Delta P_f$ and a fixing heat=$T_f$+/−$\Delta T_f$; and the like. Each local process control typically uses a feedback control loop to maintain each output characteristic ($X_i$) within a latitude (predetermined maximum permitted $\Delta X$) of a setpoint ($X_0$). That is, $X_0+\Delta X \geqq X_i \geqq X_0-\Delta X$ The output characteristics of the plurality of elements contribute to various attributes of an overall output quality specification of the system. For example, in a known xerographic or electro-photographic printing system, the above-discussed output characteristics contribute to a print image density of an output printed recording media. Other output attributes of a printing system include: graininess, contrast ratio, resolution, sharpness of lines/edges, modulation transfer function, line pairs per millimeter, and the like.

In the above example of a xerographic or electro-photographic printing system, a plurality of different elements are arranged and operated sequentially; however, the control method also may be applied to a system including a plurality of like or similar subsystems that are arranged and operated in parallel. In this regard, "like or similar subsystems" means substantially like devices (e.g., plural like xerographic or electro-photographic devices/systems), or plural devices that may function differently but have a like or similar output (e.g., plural printing systems variously including a xerographic or electro-photographic printing system, an ink jet printing system, a thermal printing system and/or another printing system). In each case, the output attributes must satisfy the same overall system output image quality specifications while maintaining sufficient consistency.

A modular document processing system is an example of a system including a plurality of like or similar subsystems, each of which has it own local process control. In a modular document processing system, the subsystems include a plurality of print engines (or marking engines). In an example modular document processing system using plural like devices, each print engine may be a xerographic or electro-photographic printing system; each print engine includes a plurality of sequentially arranged and operated image forming elements (e.g., a photoreceptor, a charging device, an exposing device, a developing device, a transfer device, a fixing device, and the like, as discussed above in the first application). Each image forming element performs a process using local process control to maintain operation of the process within a latitude around a setpoint to obtain an output characteristic; the output characteristics of the plurality of elements contribute to an attribute (e.g., image print density) of an output quality specification of the subsystem (print engine). The output quality specification of each subsystem in turn contributes to the overall output quality specification of the system.

In this modular document processing system example, each subsystem (print engine) nominally is identical; however, in practice, each of the print engines (and its respective elements) will vary slightly due to a number of internal and external factors, including manufacturing tolerances, environmental variations, age/use, and other factors. Each of the setpoints and latitudes required to achieve the desired attribute of the output quality specification of the print engine subsystems likewise will vary from subsystem to subsystem and element to element for each subsystem. Thus, conventionally each subsystem (e.g., print engine) or element (e.g., photoreceptor) individually has been allocated setpoints and latitudes around those setpoints so as to achieve desired local output characteristics and attributes satisfying the common overall output image quality specification.

In each of these conventional systems, if an element or subsystem of elements (e.g., a print engine), exceeds its allocation of latitude and is unable to self-correct by local process control of the element or subsystem, then the element or subsystem, and possibly the overall system, must either (1) shut down, (2) generate a notification that a service action is required (e.g., generate an alarm), or (3) both. Thus, although such conventional systems and control methods have utility in many applications, they have a drawback in that: (1) if one or more elements or subsystems is continuously operating in a region close to exceeding its allocated latitude, then the system operates inefficiently, and (2) if one or more elements or subsystems attempts to exceed its allocated latitude, then the element(s) or subsystem(s) may fail to operate at all.

SUMMARY

It is an object of the present disclosure to provide an improved control method for a system including a plurality of elements (or plurality of subsystems of elements), each performing a process using process control to maintain operation of the process within a latitude around a setpoint and having an output characteristic that contributes to an attribute of an overall output quality specification of the system.

It is another object of the present disclosure to provide an improved control method for such a system that overcomes the above-discussed drawbacks of conventional control methods.

It is another object of the present disclosure to provide a control method for a system including a plurality of elements (or plurality of subsystems of elements) that maintains an overall output quality of the system despite degradation of an output characteristic of one of the plurality of elements of the system.

It is another object of the present disclosure to provide an improved control method for a system including a plurality of elements (or plurality of subsystems of elements), which improves the efficiency and effectiveness of the system.

In one aspect, the present disclosure relates to a control method for a printing system that allocates for each of a plurality of elements (or plurality of subsystems of elements) setpoints and latitudes relating to an output characteristics for each element or subsystem of elements (e.g., of a print engine). Each element or subsystem of elements performs local process control (e.g., a simple feedback control loop) and a system controller monitors an amount of variability in each process and determines whether the process element is well within, near, or exceeding its limit (that is, its set allocation of latitude). If, during normal operation, an element or subsystem of elements is determined to be well behaved, that is, not using its entire allocation of latitude, this “extra variability” may be dynamically allocated to another element or subsystem of elements whose local process control is struggling to maintain an output characteristic within its allocation of latitude. Also, if the system controller determines that an element or subsystem of elements is always operating near one extreme of its set allocation of latitude, the system controller may re-set the setpoint and/or the latitude allocation of that element and/or alter the setpoint(s) and/or latitude(s) of one or more other elements or subsystems so as to move the ensemble of operating points to be further from the latitude boundaries.

In another aspect, the present disclosure relates to a control method and system that is provided with predetermined values for the setpoints and latitudes (e.g., manufacturing specifications) as starting points for process control algorithms, and the system reverts to these predetermined starting values at predetermined times or periodic timings, such as start-of-shift, cycle-up, or other intervals of the system.

In another aspect, the present disclosure relates to a control method and system in which the system controller may automatically notify service personnel that such modifications are being implemented to the system, and advantageously delays a service call by performing dynamic setpoint and latitude allocation modifications, thereby significantly improving the efficiency and effectiveness of system operation and output.

In another aspect, the present disclosure relates to a control method and system in which human input is used to set or modify setpoints and/or latitudes that will be used by the control method and system. The input may be achieved locally or remotely.

These and other objects, advantages and aspects of the present disclosure readily will be apparent to those skilled in the art in view of the following detailed description of the various embodiments of the present disclosure and the accompanying drawings.

DETAILED DESCRIPTION OF EMBODIMENTS

Figure 1:
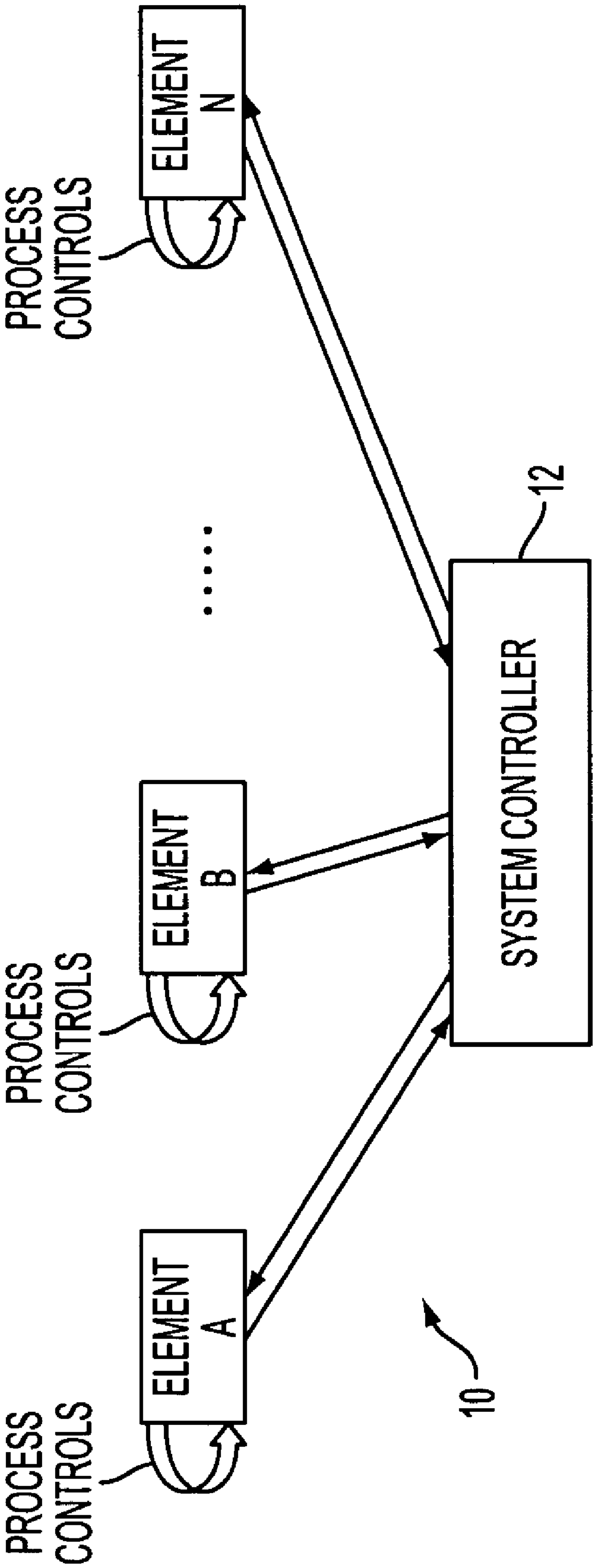
FIG. 1 schematically illustrates a system including a plurality of elements (or plurality of subsystems of elements) implementing a control method of the present disclosure.

FIG. 1 schematically illustrates a system 10 including a plurality of elements A, B, . . . N and a system controller 12. System controller 12 is shown in direct two-way communication with each of elements A, B, . . . N. In this manner, system controller 12 directly monitors and obtains information (data) relating to operating states, control states and other characteristics of each of elements A, B, . . . N and directly provides to each of elements A, B, . . . N control instructions relating to setpoints and/or latitude adjustments and the like.

Communication may be by any suitable means, including by wireless or hardwired arrangement. Alternatively, the system controller 12 and elements A, B . . . N may be arranged in communication using a common bus line. Those skilled in the art readily will appreciate numerous suitable communication methods and arrangements for any particular application.

System controller 12 may be any control device suitable to monitor operation states, control states and other characteristics of the plurality of elements A, B, . . . N and to provide control instructions thereto. For example, system controller 12 may include a central processing unit CPU, a digital signal processor DSP, application specific integrated circuits ASICs, field programmable gate arrays FPGAs, a user input interface (e.g., a keyboard, mouse and the like), a read only memory ROM for storing operation program instructions, and a random access memory RAM for storing information, including initial information relating to elements A, B, . . . N and information obtained while monitoring elements A, B, . . . N. System controller 12 also may include an input/output interface for receiving and outputting data, instructions and/or other input/output information to and/or from a user or an external source. Those skilled in the art readily will appreciate numerous alternative control devices suitable for any particular application.

As used herein, "element" means: 1) a part of a system that performs a defined process of the system using local process control, or 2) a subsystem of plural elements, each of which has one or more parts that perform respective processes of the subsystem, that in turn performs a defined process of the system using local process control. For example, in various alternative embodiments of the present disclosure described below, each of elements A, B, . . . N may be a different image processing device of a single image forming apparatus, such as a print engine (sequential arrangement); alternatively, each of elements A, B, . . . N may be a like or similar image forming apparatus, such as plural identical print engines (parallel arrangement); further alternatively, each of elements A, B, . . . N may be a different type of image forming apparatus, such as a plurality of different types of print engines (an alternative parallel arrangement). In this regard, the term "print engine" as used in this application broadly includes any print engine or marking engine suitable for a desired printing/marking application. Examples include a xerographic print engine, an electro-photographic print engine, an ink jet print engine, a thermal print engine, and the like. The number of elements A, B, . . . N is arbitrary, based on the number of elements or subsystems in the desired system. Those skilled in the art readily will be able to select suitable types and numbers of elements and/or subsystems of elements to perform a desired system application.

The control method of the present invention is described below with reference to three specific example embodiments. A first example embodiment is a printing system 10 including a system controller 12 and a plurality of image forming elements A, B, . . . N of an image forming apparatus, such as a print engine. A second example embodiment is a printing system 10 including a system controller 12 and a plurality of like or similar print engines A, B, . . . N, such as a modular document processing system. A third example embodiment is a printing system 10 including a system controller 12 and a plurality of different types of print engines A, B, . . . N, another type of modular document processing system.

In the first example embodiment, the printing system 10 comprises a plurality of different image forming elements A, B, . . . N, each performing in sequence a different image forming process of an image forming method. In particular, in this example embodiment the printing system 10 is a xerographic or electro-photographic printing system.

The plurality of image forming elements A, B, . . . N may include: a photoreceptor (e.g., a photoconductive drum, a photoconductive belt, or the like); a charging device that charges a surface of the photoreceptor (e.g., a corona charger); an exposing device that selectively exposes the photoreceptor to light to form a latent image on the surface of the photoreceptor (e.g., a scanning mirror device that scans an image-signal-modulated light beam on the surface of the photoreceptor); a developing device that applies toner particles to the latent image to develop the latent image; a transfer device that transfers the developed image from the photoreceptor to a recording media (e.g., by applying a transfer charge to the photoreceptor bearing the developed image at a transfer region); a fixing device that applies heat and pressure to the recording media and transferred image to fix the image on the recording media; and the like.

Each image forming element A, B . . . . N performs a process using local process control (e.g., a simple feedback control loop) to maintain operation of each image forming process within a latitude (window) around a setpoint to obtain one or more desired output characteristics. The image forming processes may include: a process of relatively moving the photoreceptor (e.g., rotating a photosensitive drum at a rotation speed=$S_{rot}$+/−$\Delta S_{rot}$); a process of controlling the amount of charge applied to the photoreceptor to achieve a charge density on the photoreceptor=$V_{cd}$+/−$\Delta V_{cd}$; a process of controlling the timing or intensity of light incident on the photoreceptor to achieve a latent image charge density on the photoreceptor=$V_{icd}$+/−$\Delta V_{icd}$; a process of controlling the toner particle concentration of developer applied to the latent image to achieve a toner density=$D_t$+/−$\Delta D_t$; a process of controlling the amount of transfer charge applied at a transfer nip=$V_{tc}$+/−$\Delta V_{tc}$; a process of fixing the toner image on the recording media by applying a fixing pressure=$P_f$+/−$\Delta P_f$ and a fixing heat=$T_f$+/−$\Delta T_f$; and the like.

The output characteristics ($S_{rot}$, $V_{cd}$, $V_{icd}$, $D_t$, $V_{tc}$, $P_f$, $T_f$, and the like) of the plurality of image forming elements A, B, . . . N variously contribute to a number of output attributes of an overall output image quality specification of the system. For example, several of these output characteristics contribute to a print image density D of an image formed on an output recording media. Thus, variation of any one of these output characteristics likewise causes variation of the output attribute, image density D. Moreover, variation of any one of these output characteristics likewise may cause variation in one or more other output attribute(s) of the overall system image quality specification.

Image quality specifications for each printing system are developed based primarily on customer requirements and expectations in the appropriate market sector. Systems engineering and modeling generally are used to determine initial optimal setpoints for each element in the system and to allocate latitudes around these setpoints in order to meet the image quality specifications. Each element is preset with the respective setpoints, and the process control is set to operate within the allocated latitude. In this manner, each element typically has a similar challenge in meeting its allocation.

During normal operation, each element uses its own local control, e.g., a simple feedback control loop, to maintain the image forming process of the individual element within its predetermined allocation of latitude. Conventionally, individual elements or subsystems of elements, such as printing engines, may experience more or less variability due to a number of internal and external factors, including manufacturing tolerances, environmental variations, age, amount of use, and other factors. Some elements will stay well within their allocated latitudes, while other elements may require active operation of process control algorithms and have difficulty staying within their allocated latitudes. A goal of the present embodiment is to have the printed output stay within the image quality specifications for a longer interval of time. This can provide various advantages, including improved productivity, increased availability and/or lower service cost. The present embodiment achieves this goal by monitoring the output characteristics of the plurality of elements and dynamically re-setting setpoints and/or re-allocating latitudes during normal operation, to relax requirements on some elements or subsystems of elements while tightening requirements on other elements or subsystems of elements based on data collected by monitoring the process control loops of the individual elements.

Degradation of each attribute of the image quality specifications can be caused and/or mitigated by one or a combination of elements in the image path and/or print engine.

In the present disclosure the system controller 12 monitors the output characteristics and selectively provides instructions to the various process elements A, B, . . . N to dynamically reset the setpoints or re-allocate the latitudes of the particular element or subsystem.

During normal operation, each process control loop monitors a property of the output of the element it is controlling. In the printing system of the present embodiment, these properties may include, for example, a physical dimension, a charge amount/state or an optical property. The element or subsystem local process control compares the detected/sensed property with the predetermined setpoint and allocated latitude of the element, and actuates a correction operation if the detected/sensed property is outside predetermined limits. In the printing system of the present embodiment, the detected/sensed property also is sent to a central system controller for further analysis and process control. For example, information obtained during product development regarding how each element or subsystem reacts to changes in its setpoints and latitudes, including nominal set points and latitudes, relationships among the pre-set nominal set points and latitudes, and relationships among the various elements/subsystems regarding inter-related changes to setpoints and latitudes during operation, may be input and stored in the system controller. The information could be input manually by a service technician/operator or automatically, e.g., in a handshake operation upon system initialization or upon adding a new element to the system. The system controller then may compare information obtained by monitoring the elements during operation with this stored information, determine any necessary corrections/adjustments, and dynamically re-set the setpoints and/or re-allocate the latitudes using this information.

The control method and system of the present disclosure may operate to perform one or more of the following five example scenarios. The five example scenarios are graphically illustrated in FIG. 2. In FIG. 2, each window portion represents the allocated latitude—that is, the range of values within which the output must remain to produce an attribute within the output image quality specification, and each two-headed arrow represents the actual range of values output during operation.

Figure 2A:
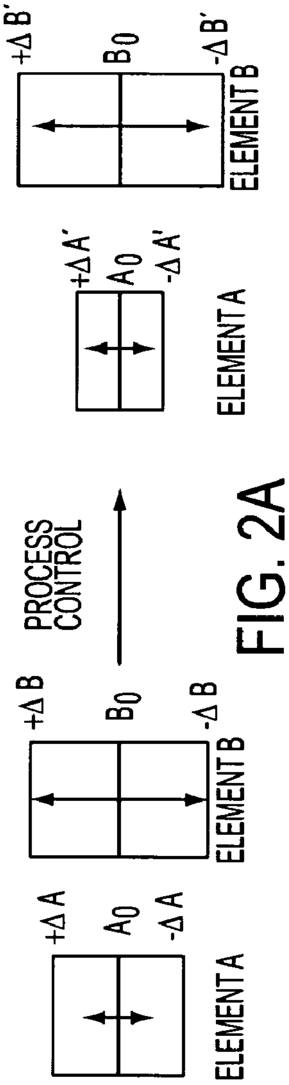
FIG. 2 schematically illustrates example scenarios of system process control of the present disclosure.

(1) Referring to FIG. 2(A), if the system controller determines that one element or subsystem of elements A is well behaved, that is, operating close to its setpoint $A_0$ with less variation than permitted by its allocation of latitude ΔA, while another element or subsystem of elements B is not well behaved, that is, requiring frequent correction operations to stay within its allocation of latitude ΔB, then the system controller could dynamically re-allocate the respective latitudes, that is, tighten (narrow) the window of latitude ΔA for the first element or subsystem of elements A, while relaxing (expanding) the window of latitude ΔB of a the second element B (that is, keep setpoints $A_0$ and $B_0$; change window of latitude ΔA to ΔA' (smaller), and change the window of latitude ΔB to ΔB' (larger)). Or stated another way, the system controller could borrow some allocation of latitude from one element that is operating with less variability and give it to another element that is operating with greater variability, to allow the system to continue operating with an acceptable output. In one aspect, this scenario could provide a significant improvement over conventional printing systems, where a user of the printing system otherwise would have to make a service call or permit a print engine to continue operating with degraded performance.

Figure 2B:
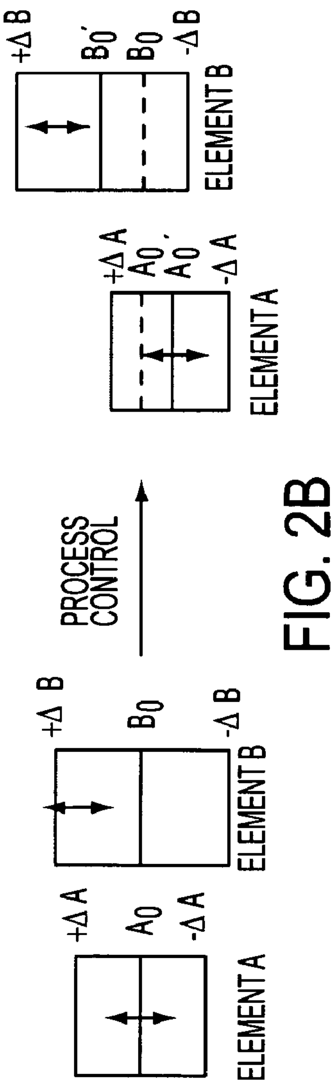

(2) Referring to FIG. 2(B), if the system controller determines that one element or subsystem of elements A is well behaved, while another element or subsystem of elements B is not well behaved, that is, continuously operating near or exceeding one extreme of its allocated latitude ΔB, the system controller could dynamically re-set setpoint $B_0$ to $B_0'$ and shift the window of latitude ΔB, to allow element B to operate in a range in which it is more well behaved, and concomitantly re-set setpoint $A_0$ to $A_0'$ and shift the window of latitude ΔA to accommodate the change in element B and maintain an acceptable system output (that is, re-set/shift setpoint $A_0$ to $A_0'$, re-set/shift setpoint $B_0$ to $B_0'$, shift the window of latitude ΔA, and shift the window of latitude ΔB).

Figure 2C:
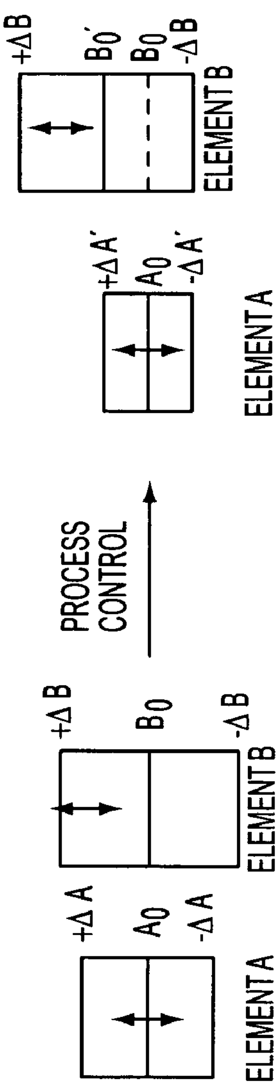

(3) Referring to FIG. 2(C), if the system controller determines that one element or subsystem of elements A is well behaved, while another element or subsystem of elements B is not well behaved, that is, continuously operating near or exceeding one extreme of its allocation of latitude ΔB, the system controller could re-set the setpoint $B_0$ to $B_0'$, closer to that extreme of the window of latitude, shift the window of latitude ΔB, and concomitantly re-allocate the window of latitude ΔA to ΔA' to accommodate the changes to element B and maintain an acceptable system output (that is, keep setpoint $A_0$, re-set/shift setpoint $B_0$ to $B_0'$, re-allocate the window of latitude ΔA to ΔA', and shift the window of latitude ΔB).

Figure 2D:
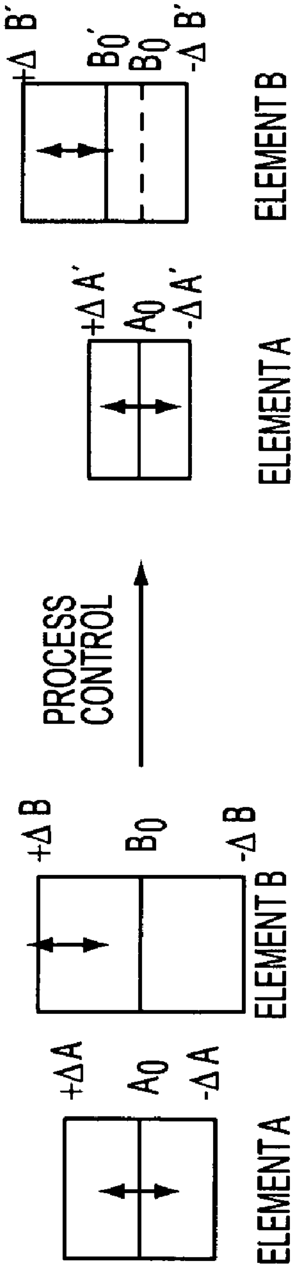

(4) Referring to FIG. 2(D), if the system controller determines that one element or subsystem of elements A is well behaved, while another element or subsystem of elements B is not well behaved, that is, continuously operating near or exceeding one extreme of its allocation of latitude, the system controller could re-set/shift setpoint $B_0$ to $B_0'$, closer to that extreme of the window of latitude, and re-allocate (narrow) the window of latitude ΔB to ΔB', and concomitantly re-allocate (narrow) the window of latitude ΔA to ΔA' to accommodate the changes in element B and maintain an acceptable system output (that is, keep setpoint $A_0$, re-set/shift setpoint $B_0$ to $B_0'$, re-allocate the window of latitude ΔA to ΔA', and re-allocate the window of latitude of latitude ΔB to ΔB').

Figure 2E:
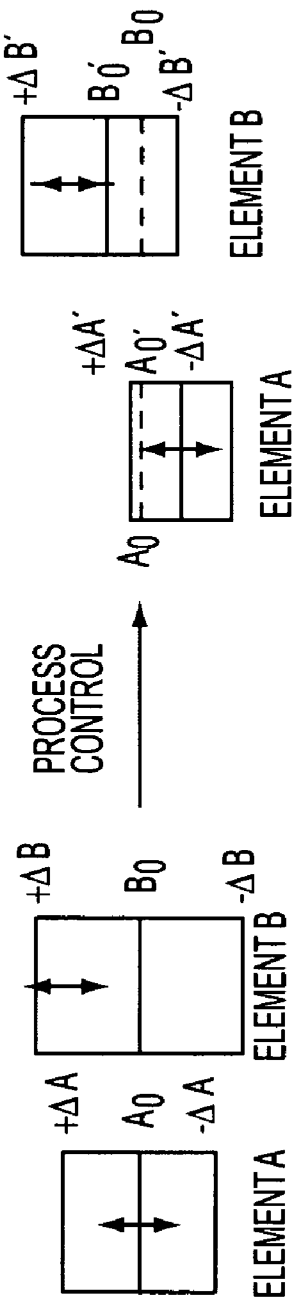

(5) Referring to FIG. 2(E), if the system controller determines that one element or subsystem of elements A is well behaved, while another element or subsystem of elements B is not well behaved, that is, continuously operating near or exceeding one extreme of its allocation of latitude ΔB, the system controller could re-set/shift setpoint $B_0$ to $B_0'$, closer to that extreme of the window of latitude, and re-allocate (narrow) the window of latitude ΔB to ΔB', and concomitantly re-set/shift setpoint $A_0$ to $A_0'$ and re-allocate (narrow) the window of latitude ΔA to ΔA' to accommodate the changes in element B and maintain an acceptable system output (that is, re-set/shift setpoint $A_0$ to $A_0'$, re-allocate window of latitude ΔA to ΔA', re-set/shift setpoint $B_0$ to $B_0'$, and shift and re-allocate window of latitude ΔB to ΔB').

In each of these example sequences, a user or the system controller could alert service personnel that one or more elements or subsystems of elements is exceeding its allocation of latitude and requires a service action. Alternatively, a service action could be postponed as a result of re-setting of setpoints and/or re-allocation of latitudes. This could provide a significant improvement over conventional systems, e.g., by increasing productivity and/or lowering service costs.

For simplicity, an example of the operation of a control method of a printing system of the present embodiment will be described with reference to scenario (1). Moreover, for simplicity the example will be described with reference to only two of a plurality of elements of the system. Those skilled in the art readily will appreciate that these concepts variously may be adapted to apply the control method to scenarios (2)-(5) and to additional multiples of elements (or subsystems of elements) for any scenario.

Figure 3A:
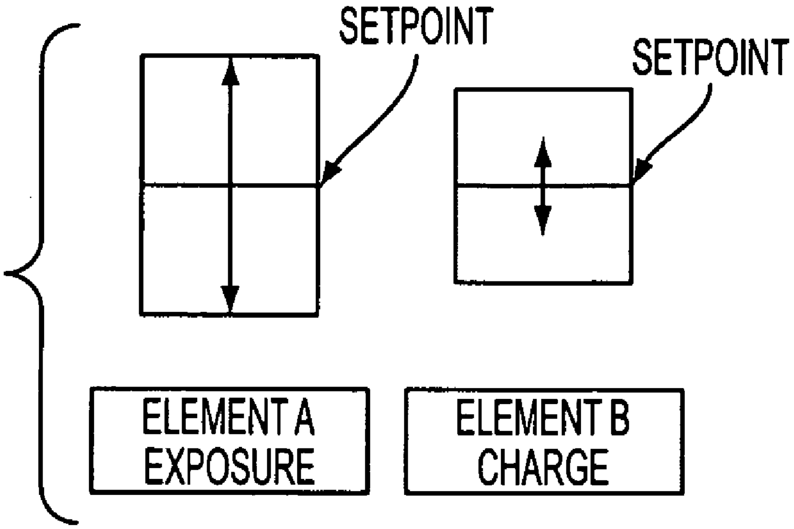
FIG. 3A schematically illustrates set points and latitude windows for exposure and charge characteristics that contribute to an image density attribute of an output image quality specification of an electro-photographic print engine.
Figure 3B:
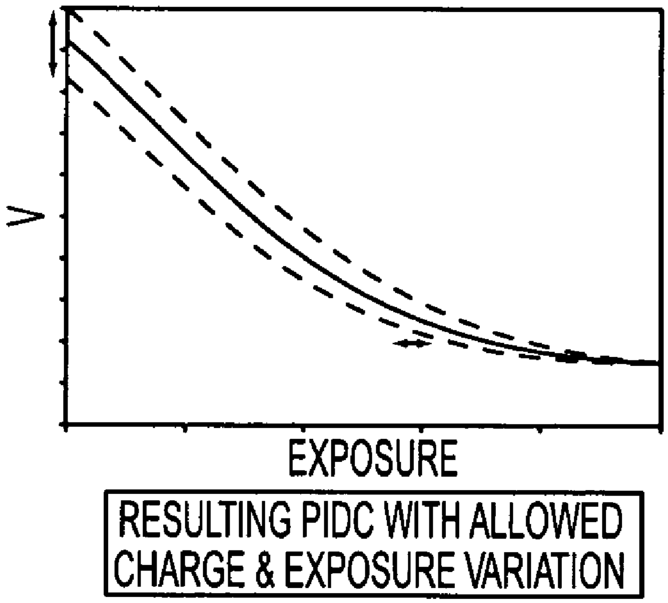
FIG. 3B is a graph illustrating a photo-induced discharging curve (PIDC), indicating allowable exposure and charge variations corresponding to the latitude windows of FIG. 3A.
Figure 4A:
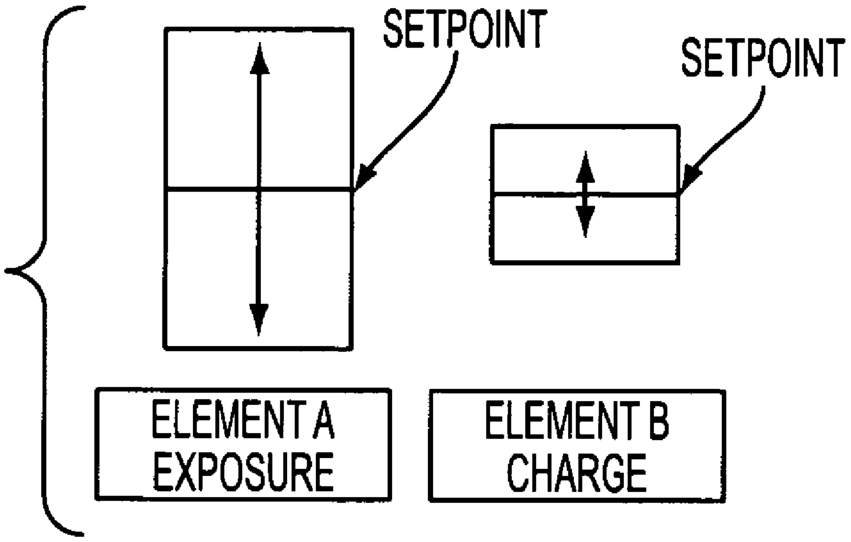
FIG. 4A schematically illustrates set points and latitude windows for exposure and charge characteristics of the print engine after re-allocation of latitudes using a control method of the present disclosure.
Figure 4B:
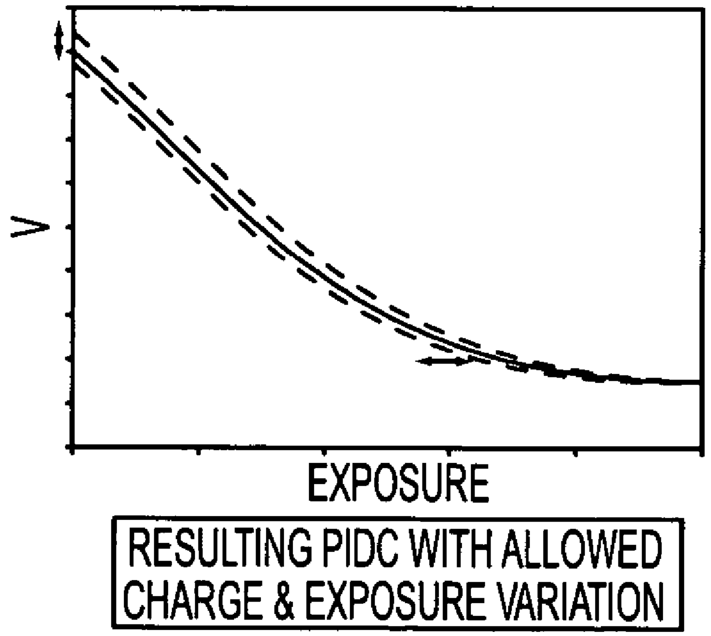
FIG. 4B is a graph illustrating a photo-induced discharging curve (PIDC), indicating allowable exposure and charge variations corresponding to the latitude windows of FIG. 4A, after dynamic modification according to the control method of the present disclosure.

FIGS. 3A, 3B, 4A and 4B illustrate a specific example of a system utilizing scenario (1). Let us assume that, because a raster output scanner (ROS) is aging, a detected exposure level is varying greatly and requiring frequent actuations of a local process control operation to stay within its preset allocation of latitude, and a detected charge level on a photoreceptor is well behaved and utilizing only small corrections under local process control to stay well within its preset allocation of latitude. FIG. 3A schematically illustrates original set points and latitude windows for exposure and charge characteristics that contribute to an image density attribute of an output image quality specification of an electro-photographic print engine; in FIG. 3A (as in FIG. 2 above), each window portion represents the allocated latitude—that is, the range of values within which the output must remain to produce an attribute within the output image quality specification, and each two-headed arrow represent the actual range of values output during operation. FIG. 3B is a graph illustrating a photo-induced discharge curve (PIDC), including horizontal and vertical arrows indicating allowable exposure and charge variations corresponding to the latitude windows of FIG. 3A. In this case, the latitude window for exposure and the latitude window for charging may be jointly re-allocated to achieve sufficiently consistent voltage on the photoreceptor. FIG. 4A schematically illustrates set points and latitude windows for exposure and charge characteristics of the print engine after re-allocation of latitudes using a control method of the present disclosure; in FIG. 4A, the window portion represents the allocated latitudes after modification, and the two-headed arrows represent the actual range of output during operation. FIG. 4B is a graph illustrating a photo-induced discharge curve (PIDC), including horizontal and vertical arrows indicating allowable exposure and charge variations corresponding to the latitude windows of FIG. 4A after dynamic modification according to the control method of the present disclosure. As shown therein, the re-allocation of latitudes maintains the overall output image quality specification (that is, maintains the desired image density) with less process control requirements, thereby improving the efficiency of the system.

Since the amount of variation in charging is less than the allowable amount, it is possible to allow more variation in exposure with the same net variation in voltage on the photoreceptor. A predetermined maximum allowable variation for exposure must be determined, because secondary effects, such as spot size changes, will occur.

All variability is by definition temporary. Thus, a user may wish not to maintain revised setpoints and/or latitudes indefinitely. In this case, for example, the system could revert to predetermined (e.g., original, nominal, initialized or default) setpoints and/or latitudes at predetermined timings or intervals, or at a startup of a shift or at each cycle-up of the system. During normal operation, new modifications could be made as required. Further, a system operator could be given the option to allow or disallow dynamic modifications during a particular run or set of operations. For example, a system operator, customer service representative or other user could (1) reset setpoints and/or latitude allocations to predetermined nominal values, or (2) reset setpoints and/or latitude allocations to arbitrary/new values, in accordance with operating conditions. A system operator, customer service representative or other user also could input to the system information relating to the various setpoints, latitude allocations and relationships among the various existing or newly added elements or subsystems of a system. Such input could be made locally, e.g., at the system controller, or remotely, e.g., via the internet, an intranet, wireless communication or the like. Alternatively, such information could automatically be transferred to or retrieved by the system controller when a new element or subsystem is added (or removed) from the system, e.g., by an initialization handshake between the system controller and a newly added element/subsystem or by a periodic polling process. Those skilled in the art readily will recognize alternative methods of communicating update control information for the system.

A control method in a modular document processing system of the second example embodiment or the third example embodiment is similar to that of the first example embodiment. In each case, each of the plurality of subsystems of elements (e.g., print engines) uses local process control to maintain operation of the subsystem according to setpoints and latitudes of the subsystem. The local process control may be a simple feedback loop. Alternatively, the local process control may be a more complex control algorithm; for example, the local process control may measure an output parameter of the subsystem (e.g., the density of a xerographic test patch), and controls one or more elements of the subsystem based on a result of the detected/measured output parameter. The system controller then monitors each of the plurality of subsystems of elements and dynamically re-sets setpoints or re-allocates latitudes of the plurality of subsystems of elements to maintain an overall output quality specification. That is, the system controller dynamically manages the various local process control functions of the plurality of subsystems of elements.

Although the present disclosure has been described with reference to particular embodiments, it is not limited thereto. It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A control method for a printing system including a plurality of elements, each performing a process using process control to maintain operation within a latitude of a setpoint and having an output characteristic that contributes to an attribute of an overall output image quality specification of the printing system, the control method comprising:

monitoring the attribute of the overall output image quality specification of the printing system;

monitoring setpoints, latitudes and output characteristics for at least two of the plurality of elements that contribute to an attribute of the overall output image quality specification of the printing system to determine whether each element is well within, near, or exceeding its currently set process limits; and dynamically re-setting the setpoint and/or re-allocating the latitude of at least two of the plurality of elements to compensate for degradation of the attribute caused by variation in the output characteristic of an element of the system during operation, thereby to maintain the attribute within a desired overall output image quality specification by dynamically allocating extra variability of at least one element found to be operating well within its currently set process limit to at least one element found to be operating near or exceeding its currently set process limit, the extra variability being allocated by reducing the setpoint and/or latitude of the at least one element found to be operating well within its limit and increasing the setpoint and/or latitude of the at least one element found to be operating near or exceeding its limit, the at least two of the plurality of elements being selected from a group including: a process element for controlling rotation of a photoreceptor drum to achieve a rotation speed=$S_{rot}$+/−$\Delta S_{rot}$; process element for controlling the amount of charge applied to a surface of the photoreceptor to achieve a charge density on the photoreceptor=$V_{cd}$+/−$\Delta V_{cd}$; a process element for controlling an intensity of light incident on the photoreceptor to achieve a latent image charge density on the photoreceptor=$V_{icd}$+/−$\Delta V_{icd}$; a process element for controlling a toner concentration of developer applied to a latent image to achieve a toner density=$D_t$+/−$\Delta D_t$; a process element for controlling an amount of transfer charge applied at a transfer region=$V_{tc}$+/−$\Delta V_{tc}$; a process element for fixing the toner image on the recording media by applying a fixing pressure=$P_f$+/−$\Delta P_f$; and a process element for fixing heat=$T_f$+/−$\Delta T_f$.

2. The control method according to claim 1, the system being a xerographic printing system, and the re-setting and re-allocating step dynamically re-setting the setpoints and/or re-allocating the latitude of at least two of the plurality of elements.

3. The control method according to claim 1, further comprising the steps of:

inputting and storing information relating to overall output image quality specification, and process control, setpoints, latitudes and output characteristics for each of the plurality of elements; and dynamically determining and re-setting/re-allocating optimum setpoints and latitudes for each of the plurality of elements based on the information stored in the inputting and storing step.

4. The control method according to claim 3, wherein the input information includes relationships relating to trade-offs among various setpoints and latitudes of the plurality of elements in the system.

5. The control method according to claim 1, further comprising the step of:

re-setting the setpoints and re-allocating the latitudes for each of the plurality of elements to predetermined default values at one of a start-of-shift timing and a cycle-up timing.

6. The control method according to claim 1, further comprising the step of:

selectively re-setting the setpoints and re-allocating the latitudes for each of the plurality of elements in accordance with user input.

7. The control method according to claim 1, the system being an electro-photographic or xerographic printing system including a plurality of different image forming elements, wherein the control method maintains the output within a desired overall output image quality specification.

8. The control method according to claim 1, the system being a modular document processing system including a plurality of print engines, wherein the control method maintains the output within a desired overall output image quality specification.

9. A printing system comprising:

a plurality of elements, each performing a process using process control to maintain operation within a latitude of a setpoint and having an output characteristic that contributes to an attribute of an overall output~quality specification of the printing system; and a controller that communicates with at least two of the plurality of elements that contribute to an attribute of the overall output image quality specification of the printing system, monitors setpoints, latitudes and output characteristics for each of the plurality of elements to determine whether each element is well within, near, or exceeding its currently set process limits, and dynamically re-sets the setpoints and/or re-allocates the latitudes of at least two of the plurality of elements to compensate for degradation of the attribute caused by variation of the output characteristic of one element of the at least two elements during operation, thereby to maintain a desired overall output image quality specification by dynamically allocating extra variability of at least one element found to be operating well within its currently set process limit to at least one element found to be operating near or exceeding its currently set process limit, the extra variability being allocated by reducing the setpoint and/or latitude of the at least one element found to be operating well within its limit and increasing the setpoint and/or latitude of the at least one element found to be operating near or exceeding its limit;

the at least two of the plurality of elements being selected from a group including: a process element for controlling rotation of a photoreceptor drum to achieve a rotation speed=$S_{rot}$+/−$\Delta S_{rot}$; process element for controlling the amount of charge applied to a surface of the photoreceptor to achieve a charge density on the photoreceptor=$V_{cd}$+/−$\Delta V_{cd}$; a process element for controlling an intensity of light incident on the photoreceptor to achieve a latent image charge density on the photoreceptor=$V_{icd}$+/−$\Delta V_{icd}$; a process element for controlling a toner concentration of developer applied to a latent image to achieve a toner density=$D_t$+/−$\Delta D_t$; a process element for controlling an amount of transfer charge applied at a transfer region=$V_{tc}$+/−$\Delta V_{tc}$; a process element for fixing the toner image on the recording media by applying a fixing pressure=$P_f$+/−$\Delta P_f$; and a process element for fixing heat=$T_f$+/−$\Delta T_f$.

10. The system according to claim 9, the system being a xerographic printing system, and the controller dynamically re-setting the setpoints and/or re-allocating the latitudes of at least two of the plurality of elements.

11. The system according to claim 9, wherein the controller further receives and stores input information relating to process control, setpoints, latitudes and output characteristics for each of the plurality of elements, and dynamically determines optimum setpoints and latitudes for each of the plurality of elements based on the stored information.

12. The system according to claim 11, wherein the input information includes relationships relating to trade-offs among various setpoints and latitudes of the plurality of elements in the system.

13. The system according to claim 9, the controller re-setting the setpoints and re-allocating the latitudes for each of the plurality of elements to predetermined default values at one of a start-of-shift timing and a cycle-up timing.

14. The system according to claim 9, the controller further comprising:

an input interface for inputting user input for selectively re-setting the setpoint and/or re-allocating the latitude for each of the plurality of elements.

15. The system according to claim 9, the system being an electro-photographic or xerographic printing system including a plurality of different image forming elements, and the controller controlling each image forming element to maintain an image quality attribute within a desired overall output image quality specification.

16. The system according to claim 9, wherein the system is a modular document processing system including a plurality of print engines, and the controller controls an output characteristic of each element to maintain an image quality attribute within a desired overall output image quality specification.

17. A recording media containing computer readable program code for executing a control method for a printing system including a plurality of elements, each performing a process using process control to maintain operation within a latitude of a setpoint and having an output characteristic that contributes to an attribute of an overall output image quality specification of the printing system, the control method comprising the steps of:

monitoring the attribute of the overall output image quality specification of the printing system;

monitoring setpoints, latitudes and output characteristics for at least two of the plurality of elements that contribute to an attribute of the overall output image quality specification of the printing system to determine whether each element is well within, near, or exceeding its currently set process limits; and dynamically re-setting the setpoint and/or re-allocating the latitude of at least two of the plurality of elements to compensate for degradation of the attribute caused by variation in the output characteristic of an element of the system during operation, thereby to maintain the attribute within a desired overall output image quality specification by dynamically allocating extra variability of at least one element found to be operating well within its currently set process limit to at least one element found to be operating near or exceeding its currently set process limit, the extra variability being allocated by reducing the setpoint and/or latitude of the at least one element found to be operating well within its limit and increasing the setpoint and/or latitude of the at least one element found to be operating near or exceeding its limit, the at least two of the plurality of elements being selected from a group including: a process element for controlling rotation of a photoreceptor drum to achieve a rotation speed=$S_{rot}$+/−$\Delta S_{rot}$; process element for controlling the amount of charge applied to a surface of the photoreceptor to achieve a charge density on the photoreceptor=$V_{cd}$+/−$\Delta V_{cd}$; a process element for controlling an intensity of light incident on the photoreceptor to achieve a latent image charge density on the photoreceptor=$V_{icd}$+/−$\Delta V_{icd}$; a process element for controlling a toner concentration of developer applied to a latent image to achieve a toner density=$D_t$+/−$\Delta D_t$; a process element for controlling an amount of transfer charge applied at a transfer region=$V_{tc}$+/−$\Delta V_{tc}$; a process element for fixing the toner image on the recording media by applying a fixing pressure=$P_f$+/−$\Delta P_f$; and a process element for fixing heat=$T_f$+/−$\Delta T_f$.

18. The recording media according to claim 17, the system being a xerographic printing system, and the re-setting and re-allocating step dynamically re-setting the setpoints and/or re-allocating the latitudes of at least two of the plurality of elements.

19. The recording media according to claim 17, the control method further comprising the steps of:

inputting and storing information relating to overall output image quality specification and process control, setpoints, latitudes and output characteristics for each of the plurality of elements; and dynamically determining and re-setting/re-allocating optimum setpoints and latitudes for each of the plurality of elements based on the information stored in the inputting and storing step.

20. The recording media according to claim 17, the control method further comprising the steps of:

inputting and storing information relating to process control, setpoints, latitudes and output characteristics for each of the plurality of elements;

monitoring output characteristics of the plurality of elements and the attribute of the overall output image quality specification during operation; and dynamically re-setting the setpoint and/or re-allocating the latitude of the at least two of the plurality of elements based on the output characteristics and attribute detected in the monitoring step and the information stored in the inputting and storing step.

* * * * *